United States Patent
Seo et al.

(10) Patent No.: US 7,260,360 B2
(45) Date of Patent: Aug. 21, 2007

(54) MULTI-BAND ZIGBEE TRANSCEIVER SUPPORTING IEEE 802.15.4 WIRELESS COMMUNICATION

(75) Inventors: Hae Moon Seo, Yongin (KR); Kwang Ho Won, Yongin (KR); Young Kuk Park, Seoul (KR); Myung Hyun Yoon, Seongnam (KR); Jun Jae Yoo, Seoul (KR)

(73) Assignee: Korea Electronics Technology Institute (KR)

( * ) Notice: Subject to any disclaimer, the term of this patent is extended or adjusted under 35 U.S.C. 154(b) by 195 days.

(21) Appl. No.: 10/981,789

(22) Filed: Nov. 5, 2004

(65) Prior Publication Data
US 2006/0019700 A1   Jan. 26, 2006

(30) Foreign Application Priority Data
Jul. 22, 2004   (KR)   ........................ 10-2004-0057195

(51) Int. Cl.
*H04B 7/00*   (2006.01)
*H04M 1/00*   (2006.01)

(52) U.S. Cl. .................................. 455/41.2; 455/553.1

(58) Field of Classification Search ............... 455/41.2, 455/102, 422, 552, 420, 127.1, 76, 553.1; 331/57, 2, 137; 375/200, 343, 272; 379/59
See application file for complete search history.

(56) References Cited

U.S. PATENT DOCUMENTS

| | | | |
|---|---|---|---|
| 5,701,106 A * | 12/1997 | Pikkarainen et al. ........ | 332/100 |
| 5,887,020 A * | 3/1999 | Smith et al. ................. | 375/130 |
| 6,570,458 B2 * | 5/2003 | Cuddy ......................... | 331/37 |
| 6,658,237 B1 | 12/2003 | Rozenblit et al. | |
| 6,704,549 B1 | 3/2004 | Sorrells et al. | |
| 6,741,638 B2 * | 5/2004 | Ramberg et al. ............. | 375/150 |
| 6,842,081 B2 * | 1/2005 | Wang et al. ............. | 331/117 R |
| 7,057,466 B2 * | 6/2006 | Chien .......................... | 331/57 |
| 7,167,696 B2 * | 1/2007 | Backes et al. ........... | 455/161.1 |
| 2005/0090208 A1 * | 4/2005 | Liao ........................... | 455/112 |

* cited by examiner

*Primary Examiner*—Nick Corsaro
*Assistant Examiner*—Shannon R. Brooks
(74) *Attorney, Agent, or Firm*—Edell, Shapiro & Finnan, LLC (57) ABSTRACT

Disclosed herein is a multi-band ZigBee transceiver for supporting IEEE 802.15.4 wireless communications. In the multi-band ZigBee transceiver, a Multi-Mode Modem (MMM) selects any one of a European version standard using 860 MHz band, a US version standard using 920 MHz band, and a worldwide version standard using 2.4 GHz ISM band among IEEE 802.15.4 standards. A frequency synthesizing unit variably adjusts a carrier frequency according to the transmission standard. A transmission unit receives a digital modulated signal, low-pass-filters the digital modulated signal with a bandwidth thereof being variably adjusted, and up-converts the filtered digital modulated signal into an RF modulated signal corresponding to the selected transmission channel. A receiving unit down-converts the RF modulated signal into a BB modulated signal using the carrier frequency, low-pass-filters the BB modulated signal with a bandwidth thereof being variably adjusted according to the selected transmission standard, converts the filtered BB modulated signal into a digital modulated signal, and outputs the digital modulated signal to the MMM. A transmission/reception switch unit outputs the RF modulated signal, input from the transmission unit, to an antenna, or outputs the RF modulated signal, received from the antenna, to the receiving unit.

25 Claims, 9 Drawing Sheets

MULTI-BAND ZIGBEE TRANSCEIVER SUPPORTING IEEE 802.15.4 WIRELESS COMMUNICATION

RELATED APPLICATIONS

The present disclosure relates to subject matter contained in priority Korean Application No. 10-2004-0057195, filed on 22 Jul. 2004, which is herein expressly incorporated by reference in its entirety.

BACKGROUND OF THE INVENTION

1. Field of the Invention

The present invention relates generally to multi-band ZigBee transceivers for supporting IEEE 802.15.4 wireless communications and, more particularly, to a multi-band ZigBee transceiver for supporting IEEE 802.15.4 wireless communications, which includes an intelligent channel selection block, thus selecting a channel to minimize the influence of many interferers, and which includes a multi-mode modem, thus selectively and simultaneously supporting European/US/worldwide version ZigBee standards that support wireless sensor networks.

2. Description of the Related Art

Recently, with the rapid increase of wireless communications, demands for wireless sensor networks among a plurality of applications related to wireless networks have increased. It is recognized that ZigBee wireless communications based on network standards of Institute of Electrical and Electronic Engineers (IEEE) 802.15.4 having low power consumption and low data rate play an important part in Ubiquitous computing.

ZigBee wireless communications can be classified into European version standard using 860 MHz band, North American (US) standard using 920 MHz band, and worldwide version standard using 2.4 GHz Industrial, Scientific and Medical (ISM) band.

Figure 1:
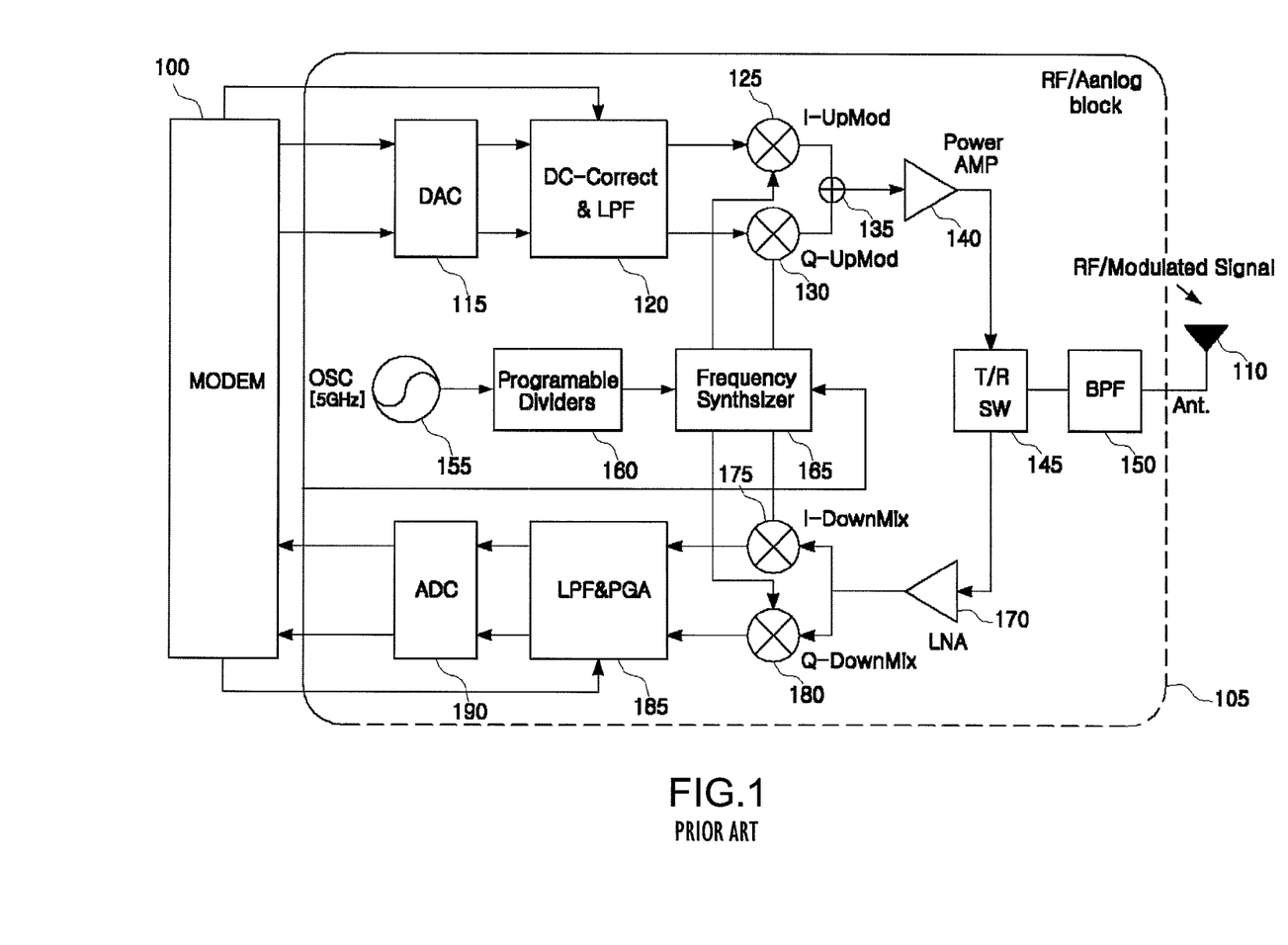
FIG. 1 is a block diagram of a conventional wireless communication transceiver.

FIG. 1 is a block diagram of a conventional wireless communication transceiver. As shown in this drawing, the typical wireless communication transceiver is composed of a BaseBand (BB) modem 100 that performs modulation and demodulation using modulation and demodulation schemes defined by the physical layer specifications of each standard, a Radio Frequency (RF) front-end block (or RF/analog block) 105 that converts a digital modulated signal, output from the modem, into an RF modulated signal and converts an RF modulated signal, received from an antenna 110, into a digital modulated signal, and the antenna 110 that wirelessly transmits and receives the RF modulated signal.

In the transmission operation of the RF front-end block 105, a Digital-Analog Converter (DAC) 115 converts a signal, digitally modulated by the modem 100, into an analog modulated signal according to bit resolution corresponding to a selected standard, and a Direct Current (DC) component correction and Low-Pass Filter (LPF) unit 120 removes a DC offset from the analog modulated signal output from the DAC 115, and low-pass-filters the analog modulated signal to a bandwidth corresponding to a selected transmission standard.

Frequency up-converters 125 and 130 up-convert the In-phase (I) component of the BB analog modulated signal, output from the DC component correction and LPF unit 120, and the Quadrature (Q) component thereof into an RF band corresponding to the selected transmission standard, and output I and Q RF modulated signal components, respectively. The I and Q RF modulated signal components are combined together by an adder 135, and the output of the adder 135 is amplified by a power amplifier 140.

The RF modulated signal is output to the antenna 110 at transmission periods based on TDD through a transmission/reception switch 145. In this case, the RF modulated signal passes through a Band-Pass Filter (BPF) 150 to allow out-of-band spurious signals to be removed therefrom.

In the reception operation of the RF front-end block 105, the RF modulated signal, input from the antenna 110, is freed from out-of-band spurious signals by the BPF 150, and is input to the transmission/reception switch 145.

The transmission/reception switch 145 outputs the RF modulated signal, output from the power amplifier 140 of a transmission side, toward the antenna 110 through the BPF 150 at the intervals of transmission and reception, or inputs the RF modulated signal, received from the antenna 110 and passed through the BPF 150, to the Low Noise Amplifier 170 of a reception side.

The LNA 170 low-noise-amplifies an analog modulated signal (RF modulated signal) in an RF frequency band. The low-noise-amplified analog modulated signal is down-converted into BB modulated signals by frequency down-conversion mixers 175 and 180 with respect to the I and Q components thereof. A low-pass filter and programmable gain amplifier 185 low-pass-filters the down-converted BB band modulated signal to channel bandwidth corresponding to the transmission standard and performs BB amplification with respect to the I and Q components.

An Analog-Digital Converter (ADC) 190 converts the above-described BB signal into a digital modulated signal according to a bit resolution corresponding to the selected transmission standard, and outputs the digital modulated signal to the BB modem 100.

In regard to the generation of a carrier, a programmable divider 160 diminishes a local oscillation frequency generated by an oscillator 155, and a frequency synthesizer 165 generates a carrier frequency using a frequency output from the programmable divider 160.

The construction of the above-described conventional wireless communication transceiver supports only a single standard. In the single-standard-supporting transceiver, it is possible to design a multi-mode transceiver by combining together transceivers for supporting respective standards in parallel so as to support multiple modes. However, in this case, it is difficult to meet cost, size and power consumption requirements demanded by a variety of applications. That is, the method of merely integrating a plurality of single standard transceivers in a system causes an increase in implementation size attributable to the duplication of functional blocks and significant power consumption, so that it is not easy in terms of product competition to adopt the method. Therefore, the necessity of a scheme of supporting multiple modes using multiple bands through the use of a single wireless transceiver has increased.

SUMMARY OF THE INVENTION

Accordingly, the present invention has been made keeping in mind the above problems occurring in the prior art, and an object of the present invention is to provide a multi-band ZigBee transceiver for supporting IEEE 802.15.4 wireless communications, which includes an intelligent channel selection block, thus selecting a channel to minimize the influence of many interferers, and which includes a multi-mode modem, thus selectively and simultaneously supporting European/US/worldwide version ZigBee standards that support wireless sensor networks.

In order to accomplish the above object, in accordance with a first aspect of the present invention, the present invention provides a multi-band ZigBee transceiver for supporting IEEE 802.15.4 wireless communications, comprising a Multi-Mode. Modem (MMM) for selecting any one of a European version standard using 860 MHz band, a US version standard using 920 MHz band, and a worldwide version standard using 2.4 GHz Industrial, Scientific and Medical (ISM) band among IEEE 802.15.4 standards in response to a received signal, and performing digital modulation/demodulation in a BaseBand (BB) according to the selected transmission standard and a transmission channel, a frequency synthesizing unit for variably adjusting a carrier frequency according to the transmission standard selected by the MMM, and outputting the carrier frequency, a transmission unit for receiving a digital modulated signal output from the MMM, low-pass-filtering the digital modulated signal with a bandwidth thereof being variably adjusted according to the selected transmission standard, and up-converting the filtered digital modulated signal into a Radio Frequency (RF) modulated signal corresponding to the selected transmission channel using the carrier frequency, a receiving unit for down-converting the RF modulated signal into a BB modulated signal using the carrier frequency, low-pass-filtering the BB modulated signal with a bandwidth thereof being variably adjusted according to the selected transmission standard, converting the filtered BB modulated signal into a digital modulated signal, and outputting the digital modulated signal to the MMM, and a transmission/reception switch unit for outputting the RF modulated signal, input from the transmission unit, to an antenna, or outputting the RF modulated signal, received from the antenna, to the receiving unit.

In accordance with a second aspect of the present invention, the present invention provides a multi-mode Radio Frequency (RF)/analog block used for a multi-band ZigBee transceiver for supporting IEEE 802.15.4 wireless communications, the transceiver performing wireless modulation/demodulation by a Multi-Mode Modem (MMM) to correspond to a transmission standard selected from a European version standard using 860 MHz band, a US version standard using 920 MHz band, and a worldwide version standard using 2.4 GHz ISM band among IEEE 802.15.4 standards, comprising a frequency synthesizing unit for variably adjusting a carrier frequency according to the selected transmission standard, and outputting the carrier frequency, a transmission unit for receiving a digital modulated signal, low-pass-filtering the digital modulated signal with a bandwidth thereof being variably adjusted according to the selected transmission standard, and up-converting the filtered digital modulated signal into a Radio Frequency (RF) modulated signal corresponding to a transmission channel using the carrier frequency, a receiving unit for down-converting the RF modulated signal into a BaseBand (BB) modulated signal using the carrier frequency, low-pass-filtering the BB modulated signal with a bandwidth thereof being variably adjusted according to the selected transmission standard, and converting the filtered BB modulated signal into a digital modulated signal, and a transmission/reception switch unit for outputting the RF modulated signal, input from the transmission unit, to an antenna, or outputting the RF modulated signal, received from the antenna, to the receiving unit.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, a multi-band ZigBee transceiver for supporting IEEE 802.15.4 wireless communications according to embodiments of the present invention will be described in detail with reference to the attached drawings.

Reference now should be made to the drawings, in which the same reference numerals are used throughout the different drawings to designate the same or similar components.

Figure 2:
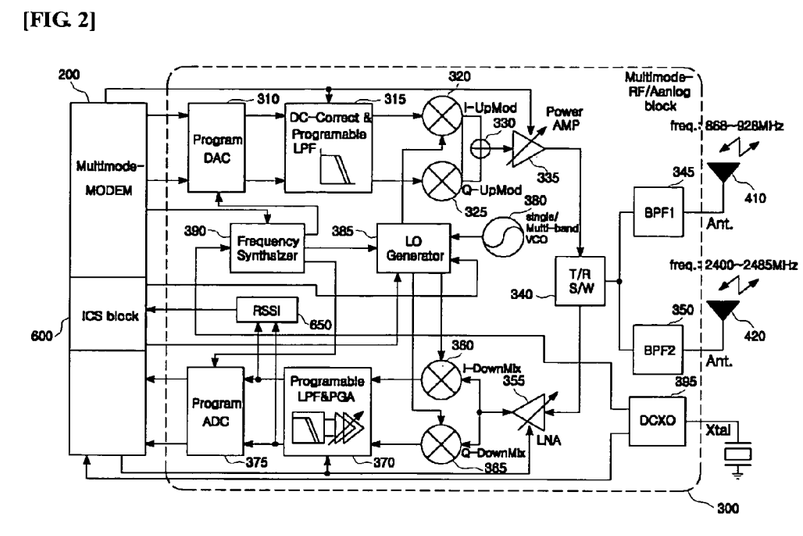
FIG. 2 is a block diagram of a multi-band ZigBee transceiver according to the present invention.
Figure 3:
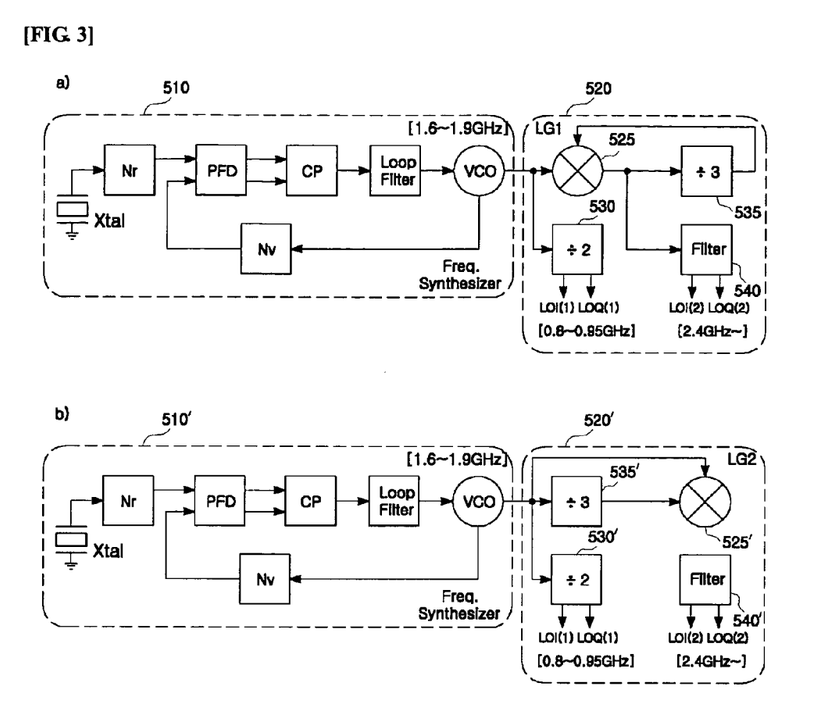
FIGS. 3a and 3b are diagrams showing examples of a LO generator of the multi-band ZigBee transceiver according to the embodiment of the present invention.
Figure 4:
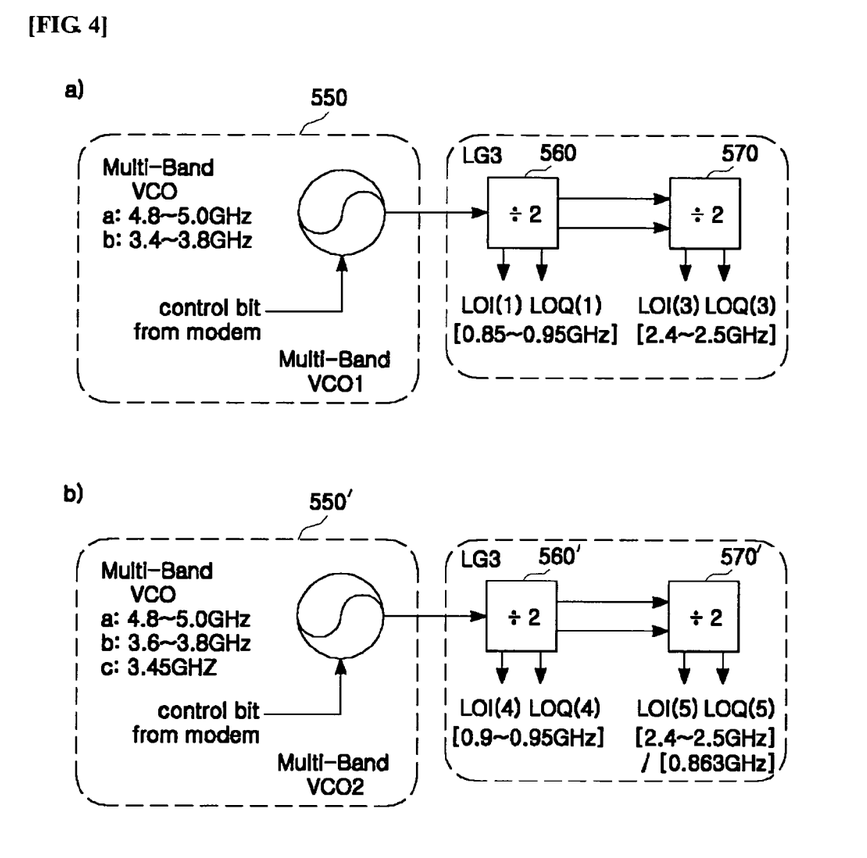
FIGS. 4a and 4b are diagrams showing other examples of the LO generator of the multi-band ZigBee transceiver according to the embodiment of the present invention.
Figure 5:
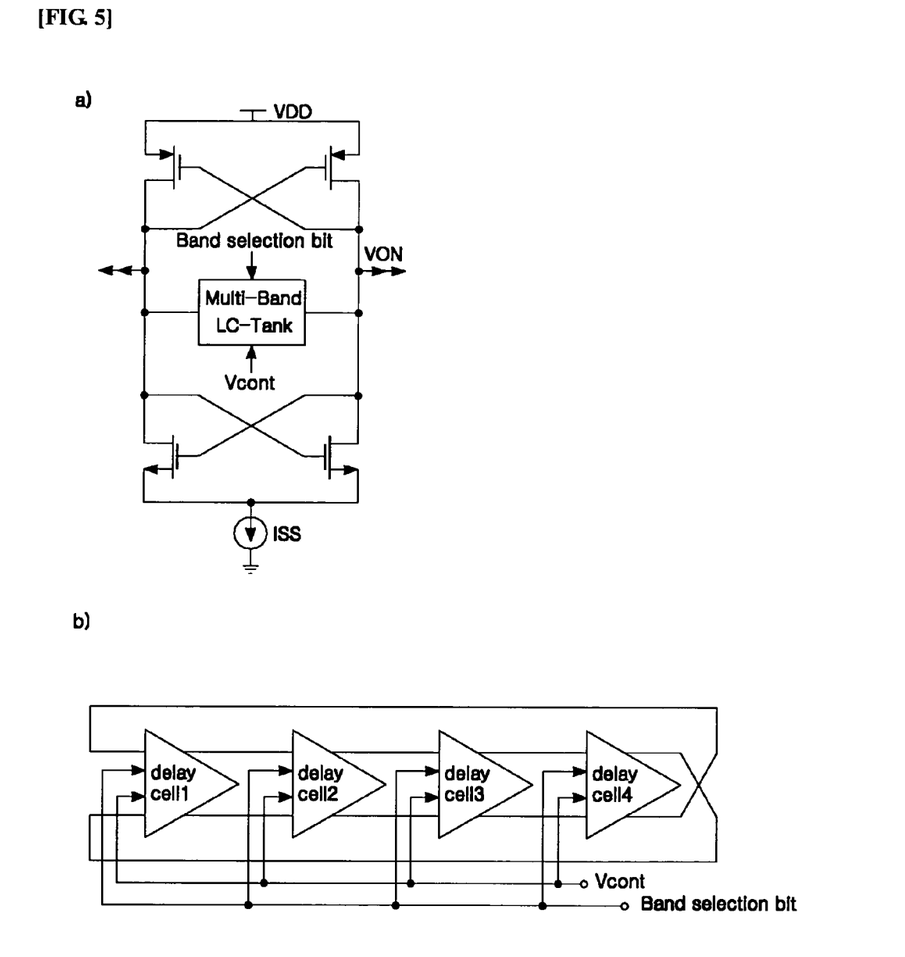
FIGS. 5a and 5b are diagrams showing examples of a multi-band Voltage Controlled Oscillator (VCO) of the multi-band ZigBee transceiver according to the embodiment of the present invention.

FIG. 2 is a block diagram of a wireless communication transceiver capable of simultaneously supporting European/US/worldwide version ZigBee standards that support wireless sensor networks using 0.8 to 2.4 GHz frequency bands according to the present invention. The multi-band ZigBee transceiver of the present invention includes a Multi-Mode Modem (MMM) 200 and a multi-mode RF/analog block 300.

The MMM 200 supports ZigBee wireless communications based on IEEE 802.15.4 standards that include ZigBee wireless communication standards using 0.8 to 2.4 GHz frequency bands, that is, European version standard using 860 MHz band, US version standard using 920 MHz band, and worldwide version standard using 2.4 GHz band. Further, the MMM 200 selects one of the European, US, and worldwide version standards in response to a received signal, and performs Offset Quadrature Phase Shift Keying (OQPSK)/Binary Phase Shift Keying (BPSK) modulation/demodulation. That is, according to the selected standard, modulation/demodulation can be performed with respect to the European version standard using the 860 MHz band, the US version standard using the 920 MHz band, and the worldwide version standard using the 2.4 GHz ISM band.

Further, the MMM 200 can additionally perform digital modulation/demodulation with respect to at least one of IEEE 802.11b and IEEE 802.11g standards using the 2.4 GHz band, and portable Internet standard using the 2.3 GHz band.

The MMM 200 may include an Intelligent Channel Selection (ICS) block 600 for selecting the channel, which is least influenced by interference, from the channels corresponding to the selected standard. The ICS block 600 selects a transmission channel based on the relationship between the BB received signal strengths and frequency offsets. A detailed description of the ICS block 600 will be made with reference to FIGS. 6 to 9.

In the meantime, the principal characteristic of the present invention is the sharing of the functional blocks of an RF front-end block, that is, the multi-mode RF/analog block 300, so as to support the physical layer (PHY) of IEEE 802.15.4 standards related to the European version standard using the 860 MHz band, the US version standard using the 920 MHz band, and the worldwide version standard using the 2.4 GHz ISM band. Further, even though options are added later to the BB modulation method of IEEE 802.15.4 standards, functions can be added to the MMM 200 of the present invention to support the additional options.

The multi-mode RF/analog block 300, which is an RF front-end block, may be divided into a transmission unit 310, 315, 320, 325, 330 and 335, a receiving unit 355, 360, 365, 370 and 375), a frequency synthesizing unit 380, 385, 390 and 395, and a transmission/reception switch unit 340. The transmission and receiving units can be implemented using direct-conversion schemes (direct-conversion or zero-IF), and can support various standards through the use of amplifiers 335 and 355 that can support wideband processing, programmable DAC and ADC 310 and 375, and programmable Low Pass Filters (LPFs) 315 and 370 that can variably adjust pass-bandwidths, respectively. The frequency synthesizing units can variably generate carrier frequencies corresponding to transmission standards and channels using a Local Oscillator (LO) generator 385 and a Digitally Compensated Crystal Oscillator (DCXO) 395.

The transmission unit of the multi-mode RF/analog block 300 is described in detail. First, the programmable DAC 310 selects a bit resolution and converts a digital modulated signal into an analog modulated signal using the MMM 200. In the case of IEEE 802.15.4 standards, the programmable DAC 310 has a bit resolution of 4 bits.

The DC-correction and programmable LPF 315 corrects the DC offset of the analog modulated signal output from the programmable DAC 310, and low-pass-filters the analog modulated signal with the pass-bandwidth thereof being variably adjusted to the channel bandwidth of the selected standard (860 MHz for European version standard, 920 MHz for US version standard, and 2.4 GHz for worldwide version standard), thus generating a spectrum waveform corresponding to the selected standard.

The frequency up-converters (I and Q) 320 and 325 up-convert the I and Q components of the analog modulated signal, output from the DC-correction and programmable LPF 315, into RF signals corresponding to the selected transmission standard and channel using the carrier frequency signal fed from the frequency synthesizing unit. That is, if the European version standard, the US version standard or the worldwide version standard is selected, the analog modulated signal is frequency-converted to correspond to a transmission channel of 860 MHz, 920 MHz, or 2.4 GHz, respectively. The RF signals are added in an adder 330 with respect to I and Q components.

The power amplifier 335 capable of performing power control amplifies the output power of the RF modulated signal, and amplifies an RF modulated signal of 860 MHz, 920 MHz or 2.4 GHz according to the selected standard.

The amplified RF modulated signal is output toward an antenna 410 or 420 through the transmission/reception switch unit (T/R SW) 340 at predetermined transmission periods, and may be passed through a Band Pass Filter (BPF) 345 or 350, prior to being input to the antenna 410 or 420, to allow out-of-band spurious signals to be removed therefrom. The antenna 410 may be used for the transmission/reception of signals having a frequency of 868 to 928 MHz, and the antenna 420 may be used for the transmission/reception of signals having a frequency of 2400 to 2485 MHz.

Further, the transmission/reception switch unit 340 inputs the RF modulated signal, received from the antenna 410 or 420 and passed through the BPF 345 or 350, to the receiving unit 355 at predetermined reception periods.

The receiving unit of the multi-mode RF/analog block 300 is described below.

The Low Noise Amplifier (LNA) 355 is capable of performing power control, and low-noise-amplifies the RF modulated signal, output from the transmission/reception switch unit 340, in an RF band. That is, the LNA 355 amplifies an RF modulated signal of 860 MHz, 920 MHz or 2.4 GHz according to the selected transmission standard.

Frequency down-conversion mixers 360 and 365 convert the I and Q components of the RF modulated signal, low-noise-amplified by the LNA 355, into BB analog modulated signals using the carrier frequency signal fed from the LO generator 385.

A programmable LPF and Programmable Gain Amplifier (Programmable LPF & PGA) 370 variably adjusts channel bandwidth according to the selected transmission standard (for example, 860 MHz for European version standard, 920 MHz for US version standard, and 2.4 GHz for worldwide version standard), low-pass-filters the down-converted I and Q components of the analog modulated signal into the variably adjusted bandwidth, and gain-amplifies the filtered analog modulated signal, thus performing an Analog-mode Channel Selection (ACS) function.

The BB digital modulated signal output from the programmable LPF and PGA 370 may be output to a Received Signal Strength Indicator (RSSI) 650 to generate a received signal strength indication signal indicating the strength of each reception channel. The received signal strength indication signal may be used in the ICS 600.

The programmable ADC 375 selects bit resolution suitable for the selected transmission standard (for example, 4-bit resolution for IEEE 802.15.4 standards), and converts the BB analog modulated signal, output from the programmable LPF and PGA 370, into a digital modulated signal. The digital modulated signal output from the programmable ADC 375 is output to the MMM 200.

Referring to the frequency synthesizing unit 380, 385, 390 and 395, the single/multi-band VCO 380 generates a local oscillation frequency signal in an RF band, for example, the 4.8 to 5.0 GHz band or the 3.4 to 3.8 GHz band. The single/multi-band VCO 380 will be described later in relation to the LO generator 385 with reference to FIGS. 3 to 5.

The frequency synthesizer 390 is formed of an integer Phase Locked Loop (PLL) or fractional PLL, and variably generates a transmission frequency corresponding to the transmission channel using a frequency output from a programmable divider (not shown) and a reference frequency output from the DCXO 395. That is, in order to support various standards, the frequency synthesizer 390 generates an I/Q-LO signal corresponding to a required standard using the programmable divider and the DCXO 395.

The LO generator 385 receives the signal output from the single/multi-band VCO 380 and the signal output from the frequency synthesizer 390, and synthesizes the received signals to generate a required band frequency. An I/Q transmission frequency signal generated by the LO generator 385 is input to the frequency up-conversion mixers 320 and 325 and the frequency down-conversion mixers 360 and 365 while being divided into I and Q components, and is used to perform frequency up-conversion and down-conversion.

FIGS. 3a and 3b are diagrams showing examples of the LO generator of the multi-band ZigBee transceiver according to the embodiment of the present invention. FIGS. 3a and 3b illustrate a LO generator using a single-band VCO 510 or 510' to support multi-band ZigBee wireless communication.

FIG. 3a shows that a LO generator 520 is connected to the single-band VCO 510 oscillating at a frequency of 1.6 to 1.9 GHz. As shown in FIG. 3a, the LO generator 520 includes a 2-divider 530 for receiving the frequency output from the single-band VCO 510 and outputting a frequency of 0.8 to 0.95 GHz, a 3-divider 535 for dividing an input frequency by 3, a mixer 525 for receiving the output frequency from the single-band VCO 510, providing the output frequency to the 3-divider 535 and mixing a signal fed back from the 3-divider 535 with the output frequency from the single-band VCO 510, and a filter 540 for filtering the output signal from the mixer 525 and outputting a frequency in 2.4 GHz band.

The signal oscillating in the crystal is generated as a stable frequency through an oscillator Nr, and is compared to a frequency, which is divided by and output from a divider Nv, by a Phase Frequency Detector PFD. The comparison result is input to a Charge Pump (CP), which generates a current proportional to the width of a pulse output from the PFD. A loop filter filters the frequency of the signal, output from the charge pump, and varies a voltage at a VCO control terminal. The VCO transmits a signal that is fed back and has a stabilized frequency, and, in this case, the single-band VCO outputs a signal having a frequency of 1.6 to 1.9 GHz.

The frequency signal output from the single-band VCO 510 is divided by the 2-divider 530, so that a frequency of 0.8 to 0.95 GHz for the European and US version standards is generated (through output signals LOI (1) and LOQ (1)). Further, the output signal from the VCO 510 is applied to the mixer 525, and a signal, which is fed back from the 3-divider 535, is also applied to the mixer 525. If the signal mixed by the mixer 525 reaches a steady-state, an undesirable sideband signal of the output signals from the mixer 525 is filtered by the filter 540, thus generating a frequency in the 2.4 GHz band for the worldwide version standard (through output signals LOI(2) and LOQ (2)).

FIG. 3b illustrates another example in which a LO generator 520' is connected to a single VCO 510' oscillating at a frequency of 1.6 to 1.9 GHz. As shown in FIG. 3b, the LO generator 520' includes a 2-divider 530' for receiving the frequency output from the single-band VCO 510' and outputting a frequency of 0.8 to 0.95 GHz, a 3-divider 535' for receiving the output frequency from the single-band VCO 510' and dividing the output frequency by 3, a mixer 525' for mixing the output frequency from the 3-divider 535' with the output frequency from the single-band VCO 510', and a filter 540' for filtering the output signal from the mixer 525' and outputting a frequency in the 2.4 GHz band.

The single-band VCO 510' is equal to the single-band VCO 510 of FIG. 3a, so a detailed description thereof is omitted.

The frequency signal output from the single-band VCO 510' is divided by the 2-divider 530', so that a frequency of 0.8 to 0.95 GHz corresponding to the European and US version standards is generated (through output signals LOI (1) and LOQ (1)). Further, the output signal from the single-band VCO 510' is applied to the 3-divider 535', and the output signal from the 3-divider 535' is then applied to the mixer 525'. The output signal from the 3-divider 535' is mixed with the signal that is output from the VCO 510' and applied to the mixer 525'. A mixed signal is filtered by the filter 540' after having reached a steady state, thus generating a frequency in the 2.4 GHz band for the worldwide version standard (through output signals LOI(2) and LOQ (2)).

FIGS. 4a and 4b are diagrams showing other examples of the LO generator of the multi-band ZigBee transceiver according to the embodiment of the present invention. As shown in FIGS. 4a and 4b, a LO generator using a multi-band VCO to support multi-band ZigBee wireless communication is depicted.

FIG. 4a shows that frequencies are synthesized using a dual-band VCO 550 that selectively outputs a frequency in the 4.8 to 5.0 GHz band or a frequency in the 3.4 to 3.8 GHz band in response to a control signal output from the MMM 200. As shown in FIG. 4a, the LO generator includes a first 2-divider 560 for receiving an output frequency from the dual-band VCO 550 and outputting a frequency of 0.85 to 0.95 GHz for the European/US version standards (through output signals LOI(1) and LOQ(1)), and a second 2-divider 570 for receiving the output frequency from the first 2-divider 560 and outputting a frequency in the 2.4 to 2.5 GHz band (through output signals LOI(3) and LOQ(3)).

FIG. 4b shows that frequencies are synthesized using a triple-band VCO 550' that selectively outputs a frequency in the 4.8 to 5.0 GHz band, a frequency in the 3.6 to 3.8 GHz band, or a frequency in the 3.45 GHz band in response to a control signal output from the MMM 200. As shown in FIG. 4b, the LO generator includes a first 2-divider 560' for receiving an output frequency from the triple-band VCO 550' and outputting a frequency of 0.9 to 0.95 GHz for the European/US version standards (through output signals LOI (4) and LOQ(4)), and a second 2-divider 570' for receiving the output frequency from the first 2-divider 560' and outputting a frequency in the 2.4 to 2.5 GHz band for worldwide version standard (through output signals LOI(5) and LOQ(5)), or a frequency in the 0.863 GHz band (through output signals LOI (5) and LOQ (5)).

FIGS. 5a and 5b are diagrams showing examples of the multi-band VCO of the multi-band ZigBee transceiver according to the embodiment of the present invention.

FIG. 5a shows an example of a multi-band VCO implemented in the form of an LC-oscillator using a multi-band LC-tank. In FIG. 5a, the multi-band LC-tank receives a band selection bit from the MMM 200 and outputs a required frequency signal.

FIG. 5b shows an example of a multi-band VCO implemented in the form of a ring oscillator using multi-band delay cells. As shown in FIG. 5b, the delay cells receive a band selection bit from the MMM 200, and output a required frequency signal.

Figure 6:
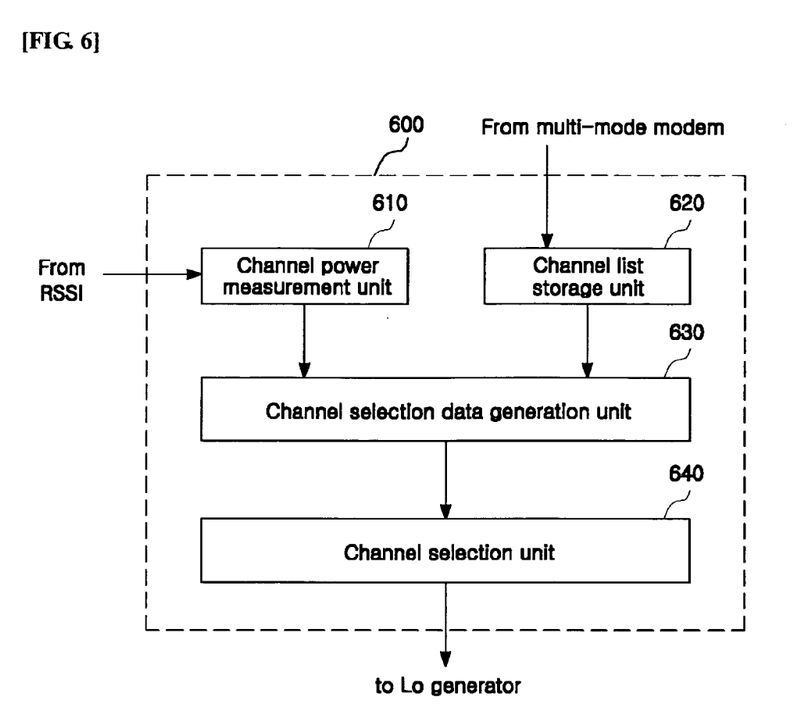
FIG. 6 is a block diagram of an intelligent channel selection unit according to the present invention.

FIG. 6 is a block diagram of the Intelligent Channel Selection (ICS) unit 600 of the multi-mode modem 200 according to the present invention. As shown in FIG. 6, the ICS block 600 of the present invention includes a channel power measurement unit 610 for measuring signal channel power (strength) received from, for example, the RSSI 650, and storing the measured channel power as signal channel power data, a channel list storage unit 620 for arranging available channels through the use of data input from the demodulation unit of the MMM 200 and storing the available channels in the form of a channel list, a channel selection data generation unit 630 for generating data, which will be used to select a channel, based on the signal channel power data and the frequency offsets of channels of the channel list, and a channel selection unit 640 for selecting the highest priority channel from the channels of the channel list based on the data for channel selection, and transmitting data related to the selected channel to the frequency synthesizer 390. In the meantime, the RSSI 650 of FIG. 2 can replace a part of or all of the functions of the above-described channel power measurement unit 610.

In more detail, the channel power measurement unit 610 generates an RSSI signal indicating received channel power for each channel, and stores the RSSI signal as signal channel power data. That is, the channel power measurement unit 610 generates the RSSI signal for each channel signal received from the antenna, and provides the RSSI signal to the channel selection data generation unit 630.

In order to measure channel power, analog data received from the programmable LPF and PGA 370 of FIG. 2 is processed and then an analog RSSI signal is generated. The analog RSSI signal is A/D converted to generate a digital RSSI signal, which is provided to the channel selection data generation unit 630. Alternatively, the above analog data is A/D converted into digital data and digitally signal-processed to generate a digital RSSI signal, which may be provided to the channel selection data generation unit 630.

The channel list storage unit 620 generates a channel list by arranging all channels available on a network to which the transceiver belongs, and stores the channel list. For example, all the channels unoccupied on the network layer of the demodulation unit (not shown) of the MMM 200 and the cell network to which the transceiver belongs are arranged and stored in the channel list.

The channel selection data generation unit 630 generates data for channel selection on the basis of signal channel power data measured in the channel power measurement unit 610 and the frequency offsets of channels of the channel list generated in the channel list storage unit 620. The data for channel selection may be various. In the embodiment of the present invention, the data for channel selection may be generated using, for example, Equation 1.

$$\omega_1 = \alpha_1(p_1-p_1) + \alpha_2(p_1-p_2) + \alpha_3(p_1-p_3) + \ldots + \alpha_k(p_1-p_k)$$

$$\omega_2 = \alpha_2(p_2-p_1) + \alpha_1(p_2-p_2) + \alpha_2(p_2-p_3) + \ldots + \alpha_{k-1}(p_2-p_k)$$

$$\omega_3 = \alpha_3(p_3-p_1) + \alpha_2(p_3-p_2) + \alpha_1(p_3-p_3) + \ldots + \alpha_{k-2}(p_3-p_k) \quad [1]$$

$$\omega_{k-1} = \alpha_{k-1}(p_{k-1}-p_1) + \alpha_{k-2}(p_{k-1}-p_2) + \alpha_{k-3}(p_{k-3}-p_3) + \ldots + \alpha_2(p_{k-1}-p_k)$$

$$\omega_k = \alpha_k(p_k-p_1) + \alpha_{k-1}(p_k-p_2) + \alpha_{k-2}(p_k-p_3) + \ldots + \alpha_1(p_k-p_k)$$

In Equation 1, $\omega_k$ is the sum of the differences between own received signal channel power and the power of other interferers, including frequency offset parameter contribution with respect to each channel number. Furthermore, $p_k$ represents received signal channel power. $\alpha_k$ is a weighting parameter, including a frequency offset factor, with respect to each channel number. $\alpha_k$ is expressed by $\rho(k-1)f_{ch}$, where k is a channel number, $\rho$ is a kind of proportional coefficient normalized with respect to the contribution of a frequency offset and the contribution of received signal channel power, and $f_{ch}$ is the frequency of a corresponding channel. Substantially, $\rho$ can be expressed by a function of interferer attenuation related to the selectivity of the receiver.

The following Equation 2 is obtained by converting the data of Equation 1 into a Channel Selection Assignment Matrix (CSAM) $W_k$.

$$W_k = \begin{bmatrix} 0 & \alpha_2(p_1-p_2) & \alpha_3(p_1-p_3) & \cdots & \alpha_k(p_1-p_k) \\ \alpha_2(p_2-p_1) & 0 & \alpha_2(p_2-p_3) & \cdots & \alpha_{k-1}(p_2-p_k) \\ \alpha_3(p_3-p_1) & \alpha_2(p_3-p_2) & 0 & \cdots & \alpha_{k-2}(p_3-p_k) \\ & & \cdots & & \\ \alpha_{k-1}(p_{k-1}-p_1) & \alpha_{k-2}(p_{k-1}-p_2) & \alpha_{k-3}(p_{k-1}-p_3) & \cdots & \alpha_2(p_{k-1}-p_k) \\ \alpha_k(p_k-p_1) & \alpha_{k-1}(p_k-p_2) & \alpha_{k-2}(p_k-p_3) & \cdots & 0 \end{bmatrix} \quad [2]$$

When the data for channel selection, for example, the CSAM data $W_k$, is generated as described above, the channel selection unit 640 selects a highest priority channel from the channels of the channel list based on the data for channel selection. A channel is not selected simply using signal channel power, for example, an RSSI signal, but is selected based on the CSAM data with frequency offsets taken into consideration. Information on the channel selected as described above is transmitted to the frequency synthesizer 390 and/or the DCXO 395 of the multi-mode RF/analog block 300 of FIG. 2, thus allowing a corresponding channel to be used.

Figure 7:
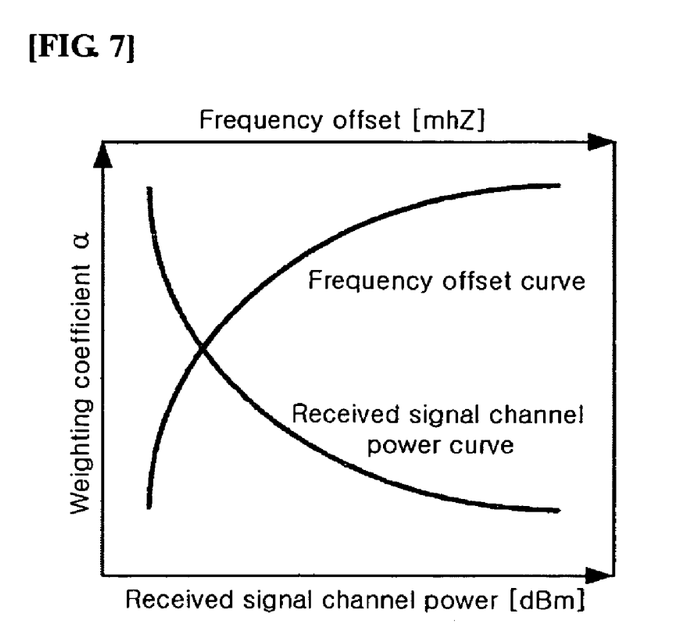
FIG. 7 is a graph showing the variations of weighting coefficient $\alpha$ according to frequency offsets and received signal channel power in general communication systems.

FIG. 7 is a graph showing the variations of a weighting coefficient α according to frequency offsets and received signal channel power in general communication systems. As shown in FIG. 7, the weighting coefficient α increases as the frequency offset increases, while the weighting coefficient α decreases as the received channel power increases. In brief, it can be known that the effect of the frequency offset is directly proportional to the effect of the received channel power.

Figure 8:
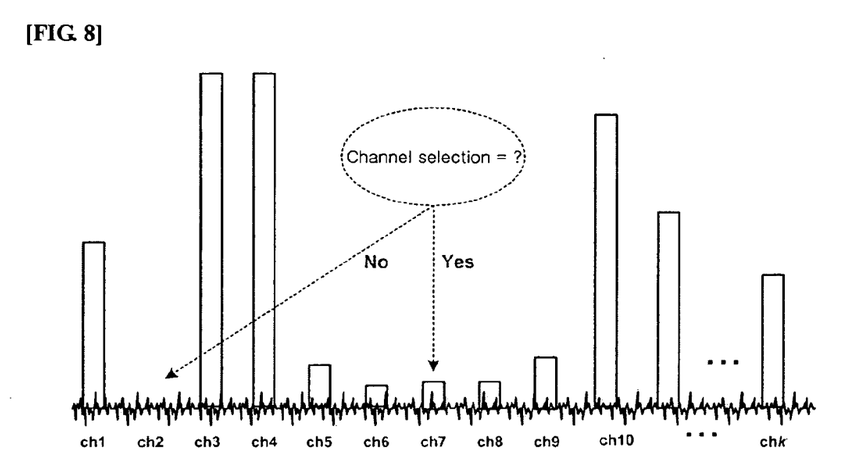
FIG. 8 is a graph showing signal channel power for channel selection in channel selection/assignment circumstances.

FIG. 8 is a graph showing signal channel power for channel selection in channel selection/assignment circumstances. As shown in FIG. 8, when signal channel power is represented for channels available to a specific mobile station, it can be known that signal channel power is lowest for channel No. 2. Therefore, when a typical Digital mode Channel Selection (DCS) scheme is used, the channel No. 2 having the lowest signal channel power is assigned to the mobile station. However, the typical DCS scheme does not consider frequency offsets at all. In particular, when the influence of the surrounding interferers is considered, the channel selection increases the minimum detectable signal level of the receiver and power consumption due to the Inter-Modulation Distortion (IMD) effects caused by stronger interferers in surrounding channels and reciprocal mixing effects. Of the channels shown in FIG. 6, channel No. 7 ch7 selected according to the intelligent channel selection of the present invention, for example, based on a calculated CSAM, with both frequency offsets and channel power taken into consideration, is assigned to the mobile station as a communication channel among the channels shown in FIG. 6.

Figure 9:
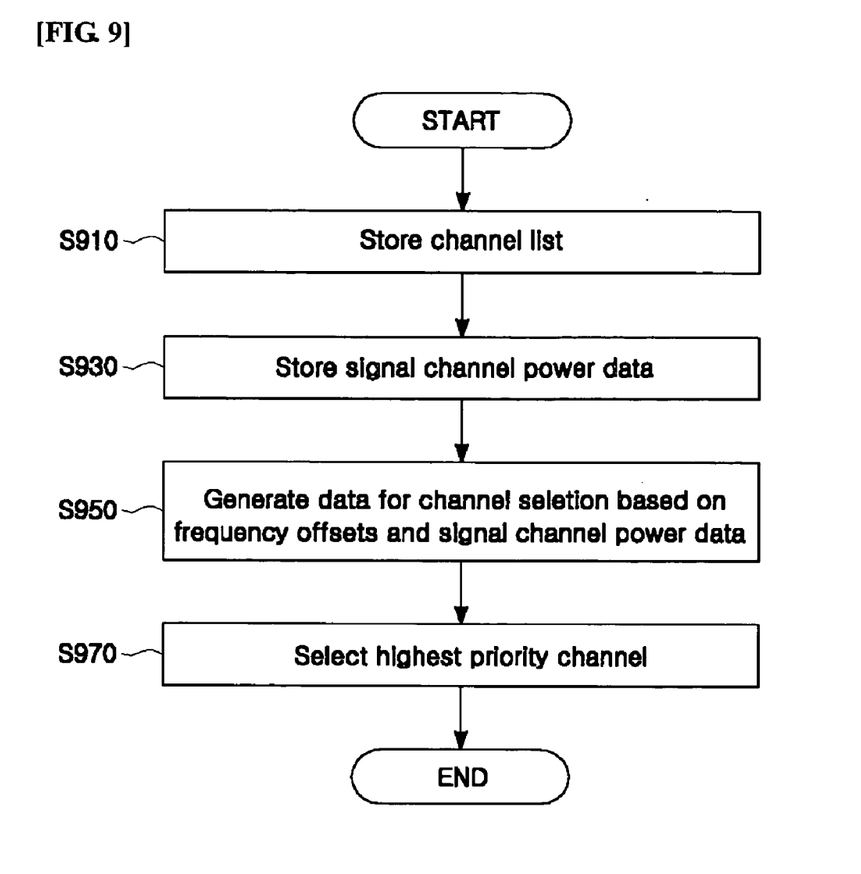
FIG. 9 is a flowchart of an intelligent channel selection method according to the present invention.

FIG. 9 is a flowchart of an intelligent channel selection method according to the present invention.

A plurality of available channels is arranged and stored in a channel list at step S910. As described above, for example, all the channels unoccupied on the network layer of the demodulation unit of the MMM and the cell network to which the transceiver belongs are arranged, and stored in the channel list.

The received signal channel power is measured for the plurality of available channels and stored as signal channel power data at step S930. At this step, for example, an RSSI signal indicating received channel power is generated for each channel, and is stored as signal channel power data.

Data for channel selection is generated based on the signal channel power data and the frequency offsets of the channels of the channel list at step S950. This step generates, for example, the above-described CSAM data.

Thereafter, the highest priority channel is selected from the channels of the channel list based on the data for channel selection at step S970. For example, the priority may be set to allow a channel having the lowest CSAM value to be selected first.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

As described above, the present invention provides a multi-band ZigBee transceiver for supporting IEEE 802.15.4 wireless communications, which includes an intelligent channel selection block, thus selecting a channel to minimize the influence of many interferers, and which includes a multi-mode modem, thus selectively and simultaneously supporting European/US/worldwide version ZigBee standards that support wireless sensor networks. The multi-band ZigBee transceiver of the present invention is advantageous in cost, use of hardware resources, size, and power consumption, compared to a conventional single-band transceiver.

What is claimed is:

1. A multi-band ZigBee transceiver for supporting IEEE 802.15.4 wireless communications, comprising:
    a Multi-Mode Modem (MMM) for selecting any one of a European version standard using 860 MHz band, a US version standard using 920 MHz band, and a worldwide version standard using 2.4 GHz Industrial, Scientific and Medical (ISM) band among IEEE 802.15.4 standards in response to a received signal, and performing digital modulation/demodulation in a BaseBand (BB) according to the selected transmission standard and a transmission channel;
    a frequency synthesizing unit for variably adjusting a carrier frequency according to the transmission standard selected by the MMM, and outputting the carrier frequency;
    a transmission unit for receiving a digital modulated signal output from the MMM, low-pass-filtering the digital modulated signal with a bandwidth thereof being variably adjusted according to the selected transmission standard, and up-converting the filtered digital modulated signal into a Radio Frequency (RF) modulated signal corresponding to the selected transmission channel using the carrier frequency;

a receiving unit for down-converting the RF modulated signal into a BB modulated signal using the carrier frequency, low-pass-filtering the BB modulated signal with a bandwidth thereof being variably adjusted according to the selected transmission standard, converting the filtered BB modulated signal into a digital modulated signal, and outputting the digital modulated signal to the MMM; and a transmission/reception switch unit for outputting the RF modulated signal from the transmission unit to an antenna, or outputting the RF modulated signal received from the antenna to the receiving unit;

wherein the MMM comprises an intelligent channel selection block comprising a channel power measuring unit, a channel list storage unit, a channel selection data generation unit coupled to the channel power measurement unit and the channel list storage unit and a channel selection unit coupled to the channel selection data generation unit, wherein the channel power measuring unit measures received power in each of a plurality of channels and stores the same, the channel list storage unit generates a channel list by arranging all channels unoccupied on at least one network to which the transceiver belongs, and stores the channel list, the channel selection data generation unit generates channel selection data on the basis of channel power data measured by the channel power measurement unit and the frequency offsets of channels in the channel list generated by the channel list storage unit, and the channel selection unit selects a channel from the channels in the channel list based on the channel selection data.

2. The multi-band ZigBee transceiver as set forth in claim 1, wherein the MMM additionally performs digital modulation/demodulation for at least one of IEEE 802.11b and IEEE 802.11g standards in 2.4 GHz band, and a portable Internet standard in 2.3 GHz band.

3. The multi-band ZigBee transceiver as set forth in claim 1, wherein the transmission unit comprises: a programmable digital-analog conversion unit for converting the digital modulated signal, generated by the MMM, into an analog modulated signal; a waveform shaper for low-pass-filtering the analog modulated signal, output from the programmable digital-analog conversion unit, with a bandwidth thereof being variably adjusted according to the selected transmission standard; a frequency up-conversion unit for up-converting the analog modulated signal, output from the waveform shaper, into an RF modulated signal corresponding to the selected transmission channel using the carrier frequency output from the frequency synthesizing unit; and a power amplifier for amplifying the up-converted RF modulated signal.

4. The multi-band ZigBee transceiver as set forth in claim 3, wherein the waveform shaper is a Direct Current (DC) correction unit for correcting a DC component of the analog modulated signal output from the programmable digital-analog conversion unit.

5. The multi-standard transceiver as set forth in claim 1, wherein the receiving unit comprises: a low noise amplification unit for low-noise-amplifying the RF modulated signal output from the transmission/reception switch unit; a frequency down-conversion unit for down-converting the RF modulated signal, output from the low noise amplification unit, into a BB analog modulated signal using the carrier frequency output from the frequency synthesizing unit; an analog channel selection unit for low-pass-filtering the analog modulated signal, output from the frequency down-conversion unit, with a bandwidth thereof being variably adjusted according to the selected transmission standard; and a programmable analog-digital conversion unit for converting the analog modulated signal, output from the analog channel selection unit, into a digital modulated signal.

6. The multi-band ZigBee transceiver as set forth in claim 5, wherein the analog channel selection unit comprises: a programmable low pass filter for low-pass-filtering the down-converted, analog modulated signal with a bandwidth thereof being variably adjusted according to the selected transmission standard; and a programmable amplifier for variably amplifying the analog modulated signal, filtered by the programmable low pass filter, according to the selected transmission standard.

7. The multi-band ZigBee transceiver as set forth in claim 5, wherein the receiving unit further comprises a received signal strength indicator for calculating a strength of the analog modulated signal filtered by the analog channel selection unit, and providing the calculated strength of the filtered analog modulated signal to the analog channel selection unit.

8. The multi-band ZigBee transceiver as set forth in claim 6, wherein the channel power measuring unit in the intelligent channel selection block measures received power from analog data received from the programmable low pass filter and programmable amplifier processed to produce an analog received signal strength indicator (RSSI) signal that is converted to a digital RSSI signal.

9. The multi-band ZigBee transceiver as set forth in claim 1, wherein the frequency synthesizing unit comprises: a single/multi-band Voltage Controlled Oscillator (VCO) for generating a local frequency in a single RF band or multiple RF bands; a Digitally Compensated Crystal Oscillator (DCXO) for generating a reference frequency according to the selected transmission standard; a frequency synthesizer for variably generating a transmission frequency corresponding to a transmission channel using the reference frequency output from the DCXO; and a Local Oscillator (LO) generator for receiving a frequency output from the single/multi-band VCO and the frequency output from the frequency synthesizer, and changing the received frequencies to a carrier frequency corresponding to the transmission channel.

10. The multi-band ZigBee transceiver as set forth in claim 9, wherein: the LO generator receives a single-band frequency of 1.6 to 1.9 GHz output from the single/multi-band VCO; and the LO generator comprises, a 2-divider for receiving the output frequency from the single/multi-band VCO and outputting a frequency of 0.8 to 0.95 GHz, a 3-divider for dividing an input frequency by 3, a mixer for receiving the output frequency from the single/multi-band VCO, providing the output frequency to the 3-divider, and mixing a signal fed back from the 3-divider with the output frequency from the single/multi-band VCO, and a filter for filtering an output signal from the mixer and outputting a frequency in 2.4 GHz band.

11. The multi-band ZigBee transceiver as set forth in claim 9, wherein: the LO generator receives a single-band frequency of 1.6 to 1.9 GHz output from the single/multi-band VCO; and the LO generator comprises, a 2-divider for receiving the output frequency from the single/multi-band VCO and outputting a frequency of 0.8 to 0.95 GHz, a 3-divider for receiving the output frequency from the single/multi-band VCO and dividing the output frequency by 3, a mixer for mixing an output frequency from the 3-divider with the output frequency from the single/multi-band VCO, and a filter for filtering an output signal from the mixer and outputting a frequency in 2.4 GHz band.

and the contribution of received signal channel power, and $f_{ch}$ is the frequency of a corresponding channel.

18. The multi-band ZigBee transceiver as set forth in claim 17, wherein the channel selection data generation unit computes a channel selection assignment matrix value $W_k$, for each channel, where $$W_k = \begin{bmatrix} o & \alpha_2(p_1-p_2) & \alpha_3(p_1-p_3) & \ldots & \alpha_k(p_1-p_k) \\ \alpha_2(p_2-p_1) & 0 & \alpha_2(p_2-p_3) & \ldots & \alpha_{k-1}(p_2-p_k) \\ \alpha_3(p_3-p_1) & \alpha_2(p_3-p_2) & 0 & \ldots & \alpha_{k-2}(p_3-p_k) \\ & & \ldots & & \\ \alpha_{k-1}(p_{k-1}-p_1) & \alpha_{k-2}(p_{k-1}-p_2) & \alpha_{k-3}(p_{k-1}-p_3) & \ldots & \alpha_2(p_{k-1}-p_k) \\ \alpha_k(p_k-p_1) & \alpha_{k-1}(p_k-p_2) & \alpha_{k-2}(p_k-p_3) & \ldots & 0 \end{bmatrix}.$$

12. The multi-band ZigBee transceiver as set forth in claim 9, wherein: the LO generator selectively receives a multi-band frequency in 4.8 to 5.0 GHz band or 3.4 to 3.8 GHz band that is output from the single/multi-band VCO, in response to a control bit output from the MMM; and the LO generator comprises, a first 2-divider for receiving the output frequency from the single/multi-band VCO and outputting a frequency of 0.8 to 0.95 GHz, and a second 2-divider for receiving an output frequency from the first 2-divider and outputting a frequency in 2.4 to 2.5 GHz band.

13. The multi-band ZigBee transceiver as set forth in claim 9, wherein: the LO generator selectively receives a multi-band frequency in 4.8 to 5.0 GHZ band, 3.4 to 3.8 GHz band, or 3.45 GHz band that is output from the single/multi-band VCO, in response to a control bit output from the MMM; and the LO generator comprises, a first 2-divider for receiving the output frequency from the single/multi-band VCO and outputting a frequency of 0.8 to 0.95 GHz, and a second 2-divider for receiving an output frequency from the first 2-divider and outputting a frequency in 2.4 to 2.5 GHz band or in 0.863 GHz band.

14. The multi-band ZigBee transceiver as set forth in claim 9, wherein the single/multi-band VCO receives a band selection bit from the MMM, and generates a local frequency in multiple RF bands using a multi-band LC-tank.

15. The multi-band ZigBee transceiver as set forth in claim 9, wherein the single/multi-band VCO receives a band selection bit from the MMM, and generates a local frequency in multiple RF bands using a plurality of delay cells connected in multiple stages.

16. The multi-band ZigBee transceiver as set forth in claim 1, wherein the channel selection data generation unit generates the channel selection data based on an equation that computes, for each channel, a sum of differences between of power for that channel and power of interferers, and taking into account contribution of a frequency offset parameter with respect to each channel.

17. The multi-band ZigBee transceiver as set forth in claim 16, wherein the channel selection data generation unit generates the channel selection data based on the equation $\omega_k = \alpha_k(p_k-p_1) + \alpha_{k-1}(p_k-p_2) + \alpha_{k-2}(p_k-p_3) + \ldots + \alpha_1(p_k-P_k)$, where $P_k$ represents received signal channel power, $\alpha_k$ is a weighting parameter, representing the frequency offset parameter with respect to each channel number k, and $\alpha_k$ is expressed by $\rho(k-1)f_{ch}$, $\rho$ is a proportional coefficient normalized with respect to the contribution of a frequency offset 19. The multi-band ZigBee transceiver as set forth in claim 18, wherein the channel selection unit selects a channel among the plurality of channels based on its channel selection assignment matrix value as compared to the channel selection assignment matrix value for other channels.

20. The multi-band ZigBee transceiver as set forth in claim 19, wherein the channel selection unit gives selection priority to channels that have lower channel selection assignment matrix values.

21. The multi-band ZigBee transceiver as set forth in claim 19, wherein the channel selection unit selects the channel that has the lowest channel selection assignment matrix value.

22. A method for selecting a channel in a multi-band radio transceiver device, comprising:
    storing a channel list of all channels unoccupied on at least one network in which the radio transceiver device is permitted to operate;
    storing channel power data representing power in each of a plurality of channels in which the radio transceiver device may operate;
    generating channel selection data based on the channel power data and frequency offsets of channels in the channel list, wherein generating channel selection data comprises computing for each channel k, $\omega_k = \alpha_k(p_k-p_1) + \alpha_{k-1}(p_k-p_2) + \alpha_{k-2}(p_k-p_3) + \ldots + \alpha_1(p_k-P_k)$, where $P_k$ represents received signal channel power, $\alpha_k$ is a weighting parameter, representing the frequency offset parameter with respect to each channel number k, and $\alpha_k$ is expressed by $\rho(k-1)f_{ch}$, $\rho$ is a proportional coefficient normalized with respect to the contribution of a frequency offset and the contribution of received signal channel power, and $f_{ch}$ is the frequency of a corresponding channel;
    selecting a channel from the channel for operation of the radio transceiver device based on the channel selection data.

23. The method of claim 22, wherein generating channel selection data comprises computing a channel selection assignment matrix value $W_k$, for each channel, where $$W_k = \begin{bmatrix} o & \alpha_2(p_1-p_2) & \alpha_3(p_1-p_3) & \ldots & \alpha_k(p_1-p_k) \\ \alpha_2(p_2-p_1) & 0 & \alpha_2(p_2-p_3) & \ldots & \alpha_{k-1}(p_2-p_k) \\ \alpha_3(p_3-p_1) & \alpha_2(p_3-p_2) & 0 & \ldots & \alpha_{k-2}(p_3-p_k) \\ & & \ldots & & \\ \alpha_{k-1}(p_{k-1}-p_1) & \alpha_{k-2}(p_{k-1}-p_2) & \alpha_{k-3}(p_{k-1}-p_3) & \ldots & \alpha_2(p_{k-1}-p_k) \\ \alpha_k(p_k-p_1) & \alpha_{k-1}(p_k-p_2) & \alpha_{k-2}(p_k-p_3) & \ldots & 0 \end{bmatrix}.$$

24. The method of claim 23, wherein selecting comprises evaluating the channel selection assignment matrix values and selecting a channel among the plurality of channels based on its channel selection assignment matrix value as compared to the channel selection assignment matrix value for other channels.

25. The method of claim 24, wherein selecting comprises giving priority to channels having lower channel selection assignment matrix values.

* * * * *